(12) United States Patent
Bigbee et al.

(10) Patent No.: US 6,920,581 B2
(45) Date of Patent: Jul. 19, 2005

(54) METHOD AND APPARATUS FOR FUNCTIONAL REDUNDANCY CHECK MODE RECOVERY

(75) Inventors: Bryant E. Bigbee, Scottsdale, AZ (US); Shivnandan Kaushik, Portland, OR (US); James B. Crossland, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 10/038,323

(22) Filed: Jan. 2, 2002

(65) Prior Publication Data

US 2003/0126498 A1 Jul. 3, 2003

(51) Int. Cl.[7] .................................................. G06F 11/00
(52) U.S. Cl. .......................................... 714/10; 717/124
(58) Field of Search ............................... 714/10, 11, 13, 714/15, 20, 37, 38, 39; 717/124, 129, 149

(56) References Cited

U.S. PATENT DOCUMENTS

| | | | |
|---|---|---|---|
| 4,176,258 A | | 11/1979 | Jackson |
| 4,792,955 A | | 12/1988 | Johnson et al. |
| 4,903,270 A | | 2/1990 | Johnson et al. |
| 5,003,466 A | * | 3/1991 | Schan, Jr. et al. ............. 714/41 |
| 5,276,690 A | | 1/1994 | Lee et al. |
| 5,410,710 A | | 4/1995 | Sarangdhar et al. |
| 5,758,169 A | * | 5/1998 | Nizar et al. .................. 710/266 |
| 5,764,660 A | | 6/1998 | Mohat |
| 5,828,578 A | * | 10/1998 | Blomgren ....................... 716/3 |
| 6,038,391 A | * | 3/2000 | Kawaba ......................... 703/21 |
| 6,061,599 A | | 5/2000 | Rhodehamel et al. |
| 6,073,251 A | | 6/2000 | Jewett et al. |
| 6,081,890 A | | 6/2000 | Datta |
| 6,108,732 A | | 8/2000 | Klein |
| 6,158,015 A | | 12/2000 | Klein |
| 6,219,742 B1 | | 4/2001 | Stanley |
| 6,247,079 B1 | | 6/2001 | Papa et al. |
| 6,247,080 B1 | | 6/2001 | Wallach et al. |
| 2002/0078394 A1 | * | 6/2002 | King ............................... 714/2 |
| 2003/0126498 A1 | * | 7/2003 | Bigbee et al. ................ 714/10 |

* cited by examiner

Primary Examiner—Nadeem Iqbal
(74) Attorney, Agent, or Firm—Blakely, Sokoloff, Taylor & Zafman LLP

(57) ABSTRACT

A method and apparatus for functional redundancy check mode recovery is disclosed. A method in accordance with one embodiment includes detecting an event associated with a device within a data processing system, initiating a platform-independent device removal sequence for the device in response to detecting the event, virtually ejecting the device from the data processing system in response to initiating the platform-independent device removal sequence, and servicing the event associated with the device in response to virtually ejecting the device from the data processing system.

24 Claims, 5 Drawing Sheets

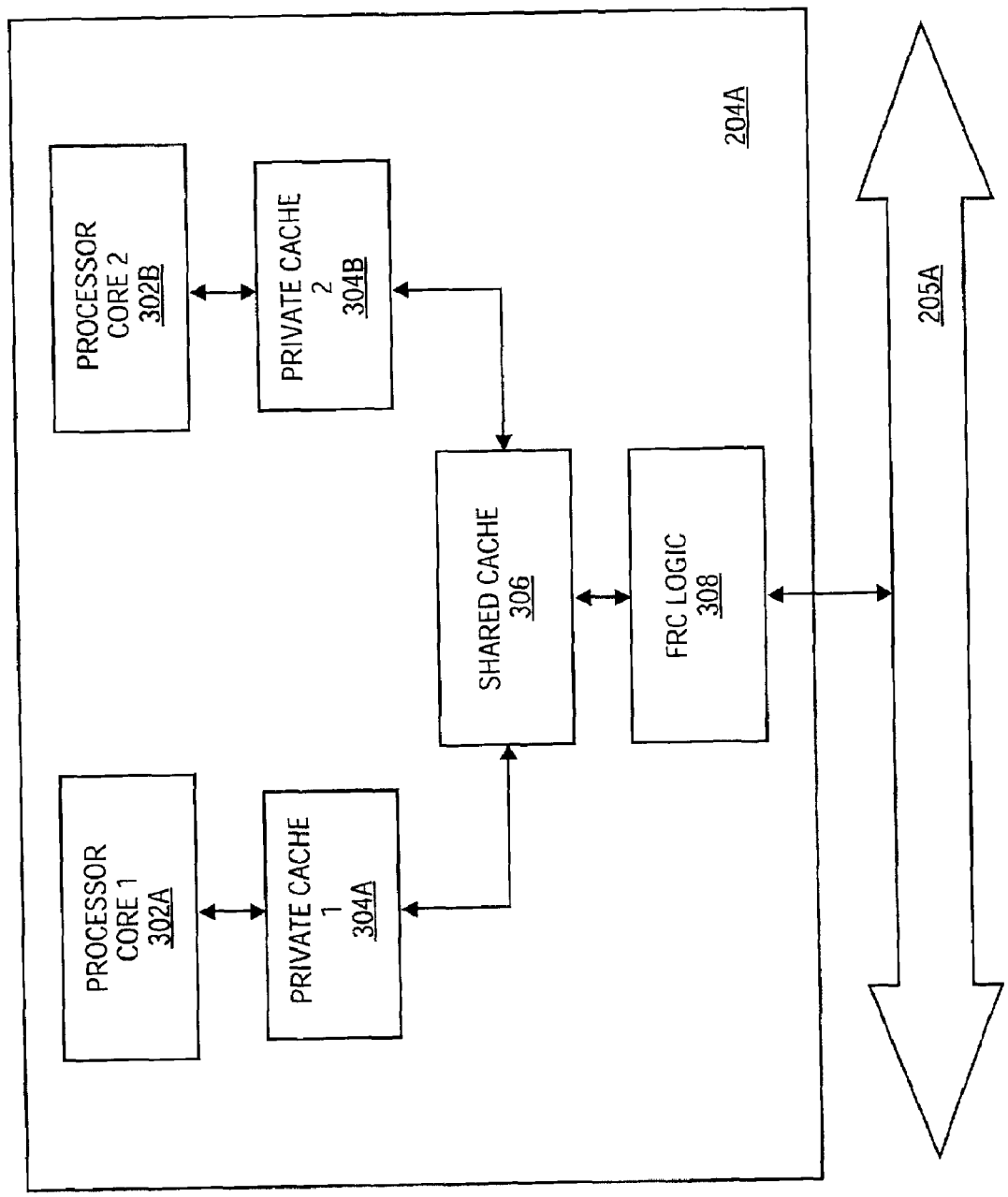

METHOD AND APPARATUS FOR FUNCTIONAL REDUNDANCY CHECK MODE RECOVERY

BACKGROUND OF THE INVENTION

The present invention relates generally to an improved method and apparatus for data processing. More particularly, the present invention relates to an improved method and apparatus for error detection and recovery within a data processing system. Still more particularly, the present invention relates to a method and apparatus for functional redundancy check mode recovery.

DESCRIPTION OF THE RELATED ART

Many modern data processing (e.g. computer) systems employ redundancy of system elements to improve system reliability and to decrease the amount of "downtime" resulting from component failures, faults, or internal errors. According to one technique for improving system reliability, two or more physical processing elements or "cores" are associated with and function as a single logical processor. Each processor core may have its own physical processor package or alternatively, two or more processor cores may be incorporated into a single processor package. The processor cores are operated in a functional redundancy check (FRC) mode in which identical instructions are provided to each core and concurrently executed on identical data so that any error occurring within a single core will produce an inconsistent result as compared to the remaining cores associated with a given processor. Specialized FRC logic performs this comparison and generates a signal such as an interrupt or exception once an inconsistent result has been detected.

In some conventional data processing systems, proprietary system management software has been utilized to perform similar error recovery while in other systems, specialized firmware has been used. According to one technique, hardware is utilized to generate a system-transparent interrupt in response to detecting a mismatch in redundantly operated processor cores. Specialized firmware receives the hardware-generated interrupt and performs appropriate recovery mechanisms. One drawback to this technique is that most conventional operating systems have a maximum tolerable interrupt latency before system errors or failures occur which varies dependent on the workload and associated devices of a data processing system. Another drawback associated with this technique is that since processor state rather than software context is typically saved it may be more difficult to validate a system's capability to recover from an error occurring at any point of the system's operation.

According to another technique, hardware is utilized to generate a specific system-visible interrupt in response to detecting a mismatch in redundantly operated processor cores. A proprietary operating system program receives the hardware-generated interrupt and performs appropriate recovery mechanisms. Since software context rather than processor state is typically saved, it may be easier to validate a system's ability to recover from errors utilizing this technique. Significant drawbacks associated with this technique however include that it burdens the operating system, limits the number and types of operating systems which may be utilized with a particular hardware platform, limits the ability of the platform to evolve, and prevents differentiation in terms of the underlying platform implementation.

BRIEF DESCRIPTION OF THE DRAWINGS

The present invention is illustrated by way of example and not limitation in the figures of the accompanying drawings in which similar references are utilized to indicate similar elements and in which:

FIG. 3 illustrates an exemplary block diagram of processor package 204a of FIG. 2 according to one embodiment of the present invention;

DETAILED DESCRIPTION

A method and apparatus for functional redundancy check mode recovery are described herein. In the following detailed description, numerous specific details such as specific data processing system, processor package, and abstraction layer interface architectures are set forth in order to provide a more thorough understanding of the present invention. It should be evident however, that these and other specific details described need not be utilized to practice the present invention. In other circumstances, well-known structures, elements, or connections have been omitted, or have not been described in particular detail in order to avoid unnecessarily obscuring the present invention.

Embodiments of the present invention may include data processing hardware, firmware, software, and various processing operations further described herein. The methods, features, and process operations of the present invention may be provided utilizing executable instructions embodied within a machine-accessible medium according to the present invention.

A machine-accessible medium may include any mechanism that provides (i.e., stores and/or transmits) information in a form accessible by a machine (e.g., a data processing system or computer). For example, a machine-accessible medium includes but is not limited to: read only memory (ROM); random access memory (RAM); magnetic disk storage media; optical storage media; flash memory devices; electrical, optical, acoustical or other form of propagated signals (e.g., carrier waves, infrared signals, digital signals, etc.); or the like. The executable instructions may be utilized to cause a general or special purpose processing element, programmed with the instructions, to perform methods or processes of the present invention. Alternatively, methods, features and operations of the present invention may be performed utilizing specific hardware components that contain hard-wired logic, or by any combination of programmed data processing components and custom hardware components.

Figure 1:
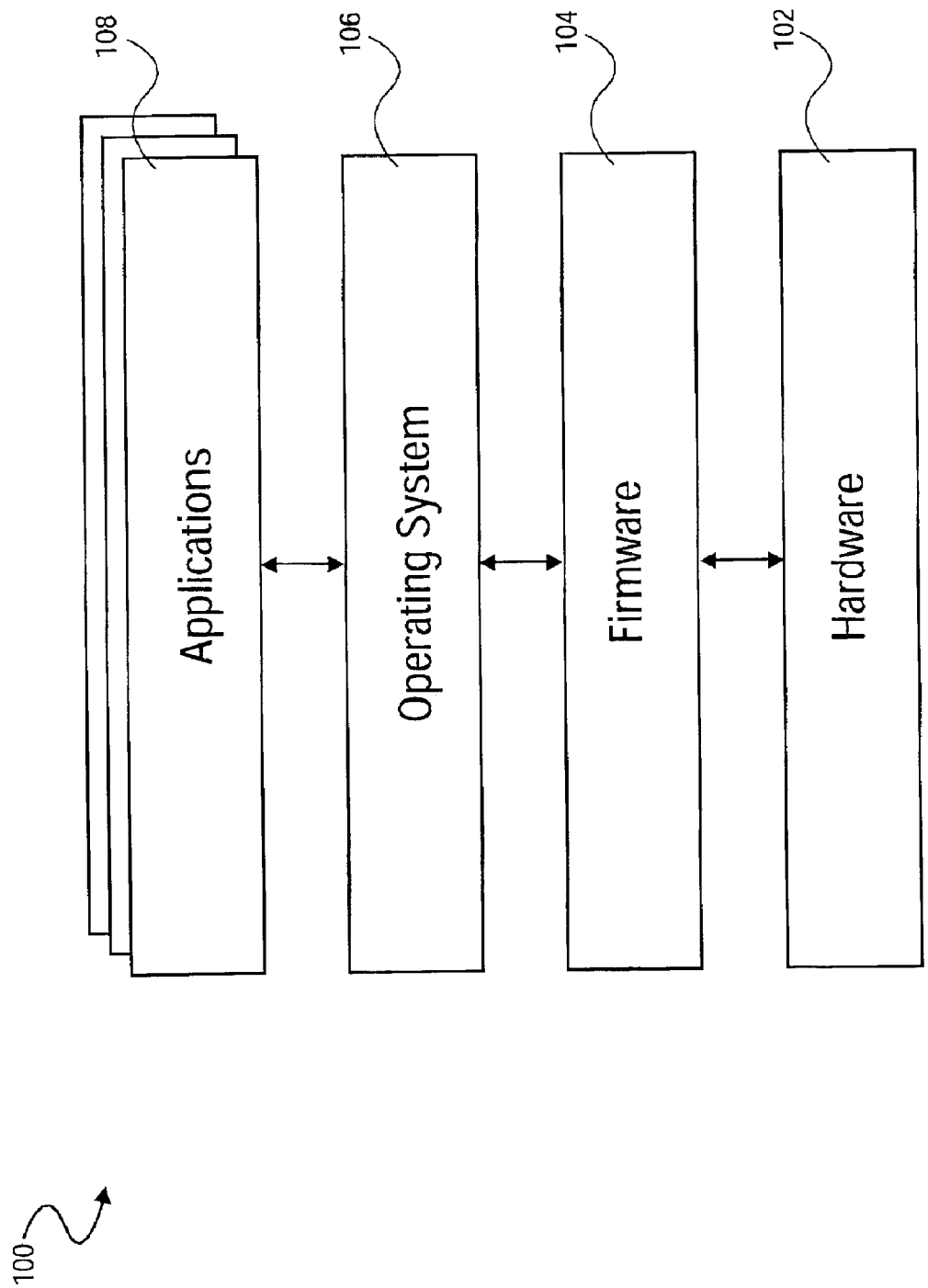
FIG. 1 illustrates an abstraction layer block diagram of a data processing system according to one embodiment of the present invention.

FIG. 1 illustrates an abstraction layer block diagram of a data processing system 100 according to one embodiment of the present invention. The illustrated data processing system 100 includes hardware 102, system management programs according to the present invention including firmware 104 and operating system 106, and application programs 108. Hardware 102 may comprise a wide variety of devices including processing elements, chipsets, volatile and non-volatile memories, mass storage devices, and input-output (I/O) devices accessed utilizing firmware 104.

Firmware 104 contains basic input-output system (BIOS) program code for data processing system 100 and it initializes, configures, and tests hardware 102 within data processing system 100 and loads some or all of an operating system 106, typically from storage, into memory in a process called initial program load (IPL). Firmware 104 provides an abstraction layer between higher (application 108 and operating system 106) layers of data processing system 200 and hardware 102 and, in one embodiment, handles machine check exceptions. Once loaded, operating system 106, which may include a kernel and various interfaces, interrupt handlers, resource managers, and device drivers, manages the various application programs 108 and hardware 102 of data processing system 100.

In one embodiment, system 100 comprises an advanced configuration and power interface (ACPI)-compliant data processing system. Accordingly, operating system 106 includes operating system-directed power management (OSPM) program code, and an ACPI device driver and firmware 104 comprises an ACPI BIOS including ACPI machine language (AML) program code describing what hardware devices are present within data processing system 100, as well as their configuration and interfaces, via ACPI control methods, objects, registers, and tables. The disclosed ACPI device driver within operating system 106 acts as an AML interpreter to interpret and execute AML program code.

When an event occurs within data processing system 100, firmware 104 or hardware 102 causes a bit to be set within an event status register, such as a general purpose event (GPE) status register, to indicate the occurrence of the event. If a corresponding bit is set within an event enable register, the occurrence of the event may be signaled to operating system 106 via the generation of a system-visible interrupt (e.g. a system control interrupt or "SCI"). The operating system 106 receives the system-visible interrupt, determines what event caused the interrupt, and then services the event by executing program code (e.g. control methods) corresponding to bits set in the event status register. Control methods may be written in an ACPI source language (ASL) and compiled into AML for inclusion with the system's BIOS. The operating system 106 executes a control method by retrieving its associated AML code from BIOS and then interpreting the retrieved code utilizing its ACPI device driver/AML interpreter.

In another embodiment, firmware 104 includes an extensible firmware interface (EFI), a system abstraction level (SAL), and a processor abstraction level (PAL). The PAL provides an abstraction of implementation-specific processor features while the SAL provides a platform abstraction, isolating the EFI and operating system 106 from implementation-specific platform differences. The EFI in turn provides an application programming interface (API) to operating system 106, allowing the operating system 106 to interact with hardware 102 via the system and processor abstraction levels. When a machine check exception occurs, it may be handled by hardware, firmware, system management (e.g. operating system) software, or not at all. For example, single bit data error correcting code (ECC) errors occurring in processor cache may be handled by processor hardware while multi-bit data ECC or parity errors occurring in processor cache may be handled by an associated PAL.

In one embodiment, hardware 102 includes two or more processor packages, where each physical processor package includes two or more physical processor cores operating lock step in FRC mode as a single logical processor from the point of view of operating system 106. Hardware 102 of the disclosed embodiment further includes FRC logic. FRC logic detects errors within individual processor cores of the described embodiment which causes hardware 102 to break lock step between at least two processor cores within a processor package, disabling FRC mode operation. Hardware 102 then disables any of the package's error containing cores, placing them into a "zombie" state, and generates a recoverable machine check exception. The generated machine check exception in turn triggers the execution of a processor error handler within a PAL of one of the package's error-free cores.

Thereafter, the processor error handler causes a platform error handler within a SAL associated with the package to be executed which initiates a platform-independent device removal sequence for a processor associated with the processor package by generating a system control interrupt (SCI) to operating system 106. In one embodiment, the SCI is generated using an INT_OUT command capability associated with, for example, the 870 chipset manufactured by Intel Corporation of Santa Clara, Calif.

In another embodiment, the disclosed processor error handler comprises a PALE_CHECK firmware routine within a PAL of one of the package's error-free cores and the platform error handler comprises SALE_ENTRY and SAL_CHECK firmware routines within an associated SAL. PALE_CHECK saves minimal processor state, determines if the machine check exception's associated errors/events are processor-related, saves processor-related error information, attempts to correct processor-related errors where possible, and then passes control to SALE_ENTRY which branches to SAL_CHECK. SAL_CHECK in turn saves additional processor and platform error and state information, attempts to correct any platform hardware-specific errors, and then generates an SCI to operating system 106 as described.

Firmware 104, via the disclosed SAL and PAL, then returns control of the package's error-free cores to operating system 106 which resumes its execution at the point it was interrupted by the generation of the machine check exception. Operating system 106 receives or detects the firmware-generated SCI and utilizes ACPI control methods to determine that the interrupt was caused by a request for processor removal or ejection. Operating system 106 responsively modifies its internal data structures to reflect that the package's associated processor is offline including saving the context of any threads being executed by operating system 106 on the associated processor, removing it from the mask of current processors, and disabling interrupts to and from the processor. In another embodiment, operating system further writes back the contents of and then disables the associated processor's caches.

Operating system 106 next utilizes ACPI control methods to virtually eject the processor from data processing system 100. In one embodiment of the invention, this has no effect on hardware 102 other than to communicate to the ACPI BIOS within firmware 104 that the processor's package is being taken offline and to ensure that it is reset or "re-initialized" to the state needed for it to be subsequently awakened or "activated" by operating system 106. In another embodiment, virtually ejecting the processor results in the physical removal of power from its associated processor package.

Firmware 104, via ACPI BIOS program code then resets the package to its original state at the time of operating system 106 initial load/boot. In alternative embodiments of the invention, this reset may comprise a "cold" reset or "RESET" operation or a "warm" or "INIT" reset operation. An associated SAL reinitializes the package and re-enables FRC mode lock step operation between two or more of the package's associated processor cores in response to detecting the ACPI BIOS-initiated reset operation. In yet another embodiment, the package's associated SAL initiates a platform-independent device insertion sequence for the processor package's associated processor by generating a system control interrupt (SCI) to operating system 106 via the previously disclosed INT_OUT command capability.

Operating system 106 receives the firmware-generated SCI and utilizes ACPI control methods to determine that the interrupt was caused by a request for processor insertion. Operating system 106 responsively modifies its internal data structures to reflect that the package's associated processor is being brought online and then wakes and configures the associated processor for use. While specific firmware components have been described herein, it should be appreciated that alternative embodiments of the present invention may be implemented utilizing alternative firmware components and/or a combination of platform independent and dependent software components.

Figure 2:
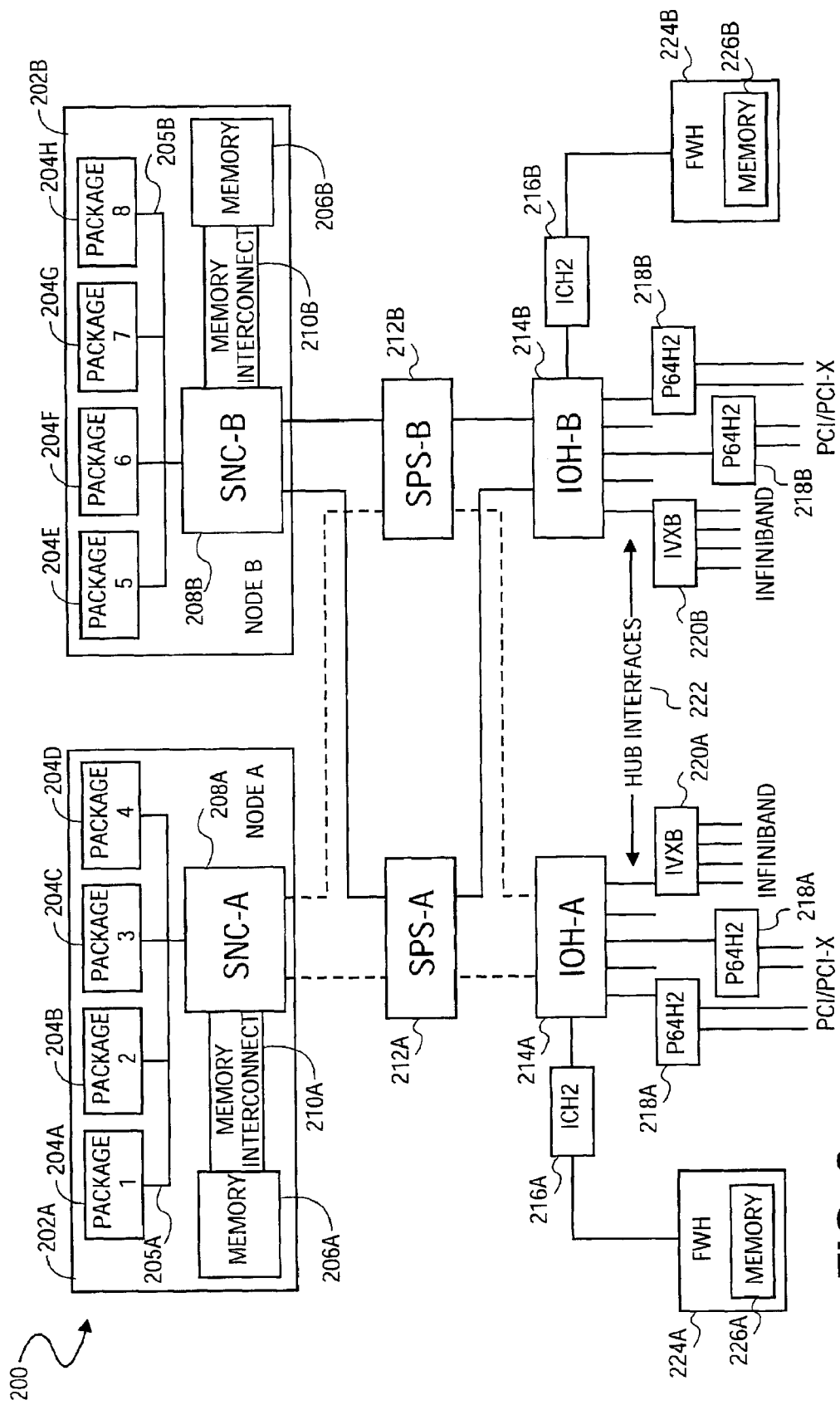
FIG. 2 illustrates an exemplary data processing system according to one embodiment of the present invention.

FIG. 2 illustrates an exemplary data processing system 200 according to one embodiment of the present invention. The data processing system 200 of the illustrated embodiment includes a first node 202a "Node A" and a second node 202b "Node B" coupled together and to various shared resources (e.g. memory, mass storage devices, I/O devices, etc.) via a shared interconnect including one or more scalability port switches. For example, Node A 202a of the illustrated embodiment may be coupled to and communicate with Node B 202b and various shared storage and I/O devices via a shared interconnect comprising a first scalability port switch (SPS) 212a "SPS-A" and a second SPS 212b "SPS-B".

Node A 202a of the illustrated embodiment includes a plurality of processor packages 204a–d and a memory 206a. Each processor package 204a–d may contain one or more physical processor cores associated with one or more logical processors. In one embodiment, each of the illustrated processor packages 204a–d includes a pair of processor cores operable in an FRC mode as a single logical processor. Memory 206a is capable of storing data and/or processor-executable instructions and may comprise any suitable memory such as dynamic random access memory (DRAM) for example. Node A 202a further includes a scalable node controller (SNC) 208a "SNC-A" coupled to each processor package 204a–d via a shared bus 205a and to memory 206a via a memory interconnect 210a. SNC-A 208a of the illustrated embodiment may be further utilized to coupled Node A 202a to SPS-A 212a and SPS-B 212b of the shared interconnect as illustrated. Additional nodes (e.g. Node B 202b) may include substantially identical components operating in a substantially identical manner as those of Node A 202a. Node B 202b of the illustrated embodiment has accordingly not been described in order to avoid unnecessarily obscuring the present invention.

Each SPS (212a, 212b) may in turn be coupled to a first I/O hub (IOH) 214a "IOH-A" and a second IOH 214b "IOH-B" as illustrated, allowing a greater number and variety of shared devices such as memory, mass storage devices (e.g. optical or magnetic storage devices), and I/O devices (e.g. display devices, keyboards, mice, trackballs, network interface cards, etc.) to be coupled to data processing system 200 via each IOH's hub interfaces 222. For example, IOH-A 214a may be coupled to and communicate with a conventional I/O hub 216a "ICH2", one or more peripheral component interconnect (PCI) or PCI extended (PCI-X) controller hubs 218a "P64H2", and an Infiniband controller hub 220a "IVXB" via hub interfaces 222 as illustrated. IOH-B 214b may be similarly coupled to a conventional I/O hub 216b, PCI/PCI-X controller hubs 218a, and an Infiniband controller hub 220a as shown, however, in alternative embodiments of the present invention, each IOH may be coupled to any number or combination of controller hubs, mass storage, memory, or I/O devices, or the like.

ICH2 216a of the illustrated embodiment provides an interface to peripheral components or other devices for data processing system 200. ICH2 216a may comprise any suitable interface controller to provide for any suitable communication link to IOH-A 214a and/or to any suitable device or component in communication with ICH2 216a. ICH2 216a for one embodiment provides suitable buffering and arbitration for each interface. ICH2 216a may be further coupled to and provide an interface to a firmware hub (FWH) 224a as illustrated. FWH 224a may comprise any suitable interface controller to provide for any suitable communication link to ICH2 216a. In the illustrated embodiment, FWH 224a comprises a memory 226a to store one or more firmware interfaces (e.g. SAL or ACPI BIOS program code) according to the present invention. Memory 226a may comprise any suitable memory capable of storing data and/or processor-executable instructions. In one embodiment, memory 226a comprises a non-volatile memory such as a read-only memory (ROM), programmable read-only memory (PROM), flash memory, or the like.

While a specific embodiment of data processing system 200 has been illustrated herein, it should be appreciated that additional alternative embodiments as well as variations or modifications of the illustrated exemplary embodiment may be implemented within the scope of the present invention. For example, in one alternative embodiment, data processing system 200 may be implemented with a single node having more or fewer components than the nodes 202a–b depicted. A node may accordingly be coupled to available resources without the use of a scalability port switch by coupling, for example an associated scalable node controller directly to one or more I/O hubs. Firmware interfaces (e.g. SAL or ACPI BIOS program code) according to the present invention may also be stored within Node A 202a either within existing memory 206a or an additional memory coupled to SNC-A 208a directly or via a conventional I/O hub and FWH as described with respect to memory 226a.

It should similarly be appreciated that the present invention may be practiced utilizing a data processing system 200 having a greater or lesser number of components as the illustrated exemplary system. For example, data processing system 200 may comprise, in alternative embodiments of the present invention, one of a wide variety of server or client computer systems or devices such as a workstation, personal computer, "thin client" (i.e. network computer or NetPC), Internet appliance, terminal, palmtop computing device, robust cellular or Personal Communications Services (PCS) telephone, "thin server" (sometimes called an appliance server, application server, or specialty server), or the like. In one embodiment, data processing system 200 comprises a high-availability server data processing system.

FIG. 3 illustrates an exemplary block diagram of processor package 204a of FIG. 2 according to one embodiment of the present invention. In the illustrated embodiment, a processor package 204a may be coupled to a shared "front side" bus 205a, and may include functional redundancy check (FRC) logic 308, a shared cache memory 306, and a first processor core 302a and a second processor core 302b, each having an associated private cache memory 304a and 304b, respectively. Within the present description, the term "processor core" or "core" describes a physical processing element or execution entity, the term "processor package" or "package" describes a physical entity which incorporates, houses, or contains one or more processor cores. The term "processor" may therefore be utilized to describe either a physical processing element or execution entity, or a logical processing element or execution entity as viewed by system management or application software (e.g. operating system software).

In one embodiment, the first and second processor cores 302a–b within the depicted processor package 204a may be bound together to function as a single logical processor from the point of view of operating system software. Both cores 302a and 302b operate in an FRC mode in which identical instructions may be provided to each core and concurrently executed on identical data utilizing FRC logic 308. Processor cores 302a, 302b may each comprise any suitable processor architecture and for one embodiment comprise an Intel™ Architecture, used for example, in the Itanium™ family of processors available from Intel™ Corporation of Santa Clara, Calif. FRC logic 308 operates processor cores 302a–b as a single logical processor by concurrently providing each with identical data and instructions. Each processor core 302a–b executes instructions and processes data to generate results which may then be stored within an associated private (e.g. 304a–b) and/or shared (e.g. 306) cache. FRC logic 308 monitors processor core store operations or "writes" to shared cache 306 to detect inconsistencies in the generated results which indicate an FRC mismatch error. Such inconsistencies can occur as a result of partial or total hardware failure, or the effect of an alpha particle or other form of natural or artificial radiation impacting one or more processor cores.

In alternative embodiments, FRC logic 308 may be implemented as executable firmware or dedicated hardware coupled with or incorporated into one or more of the processor package's 204a components. In yet another embodiment, a plurality of processor packages are provided, each including a single processor core with FRC logic being provided either within each processor package or external to each package to operate two or more of the package's associated processor cores in an FRC mode.

Figure 4A:
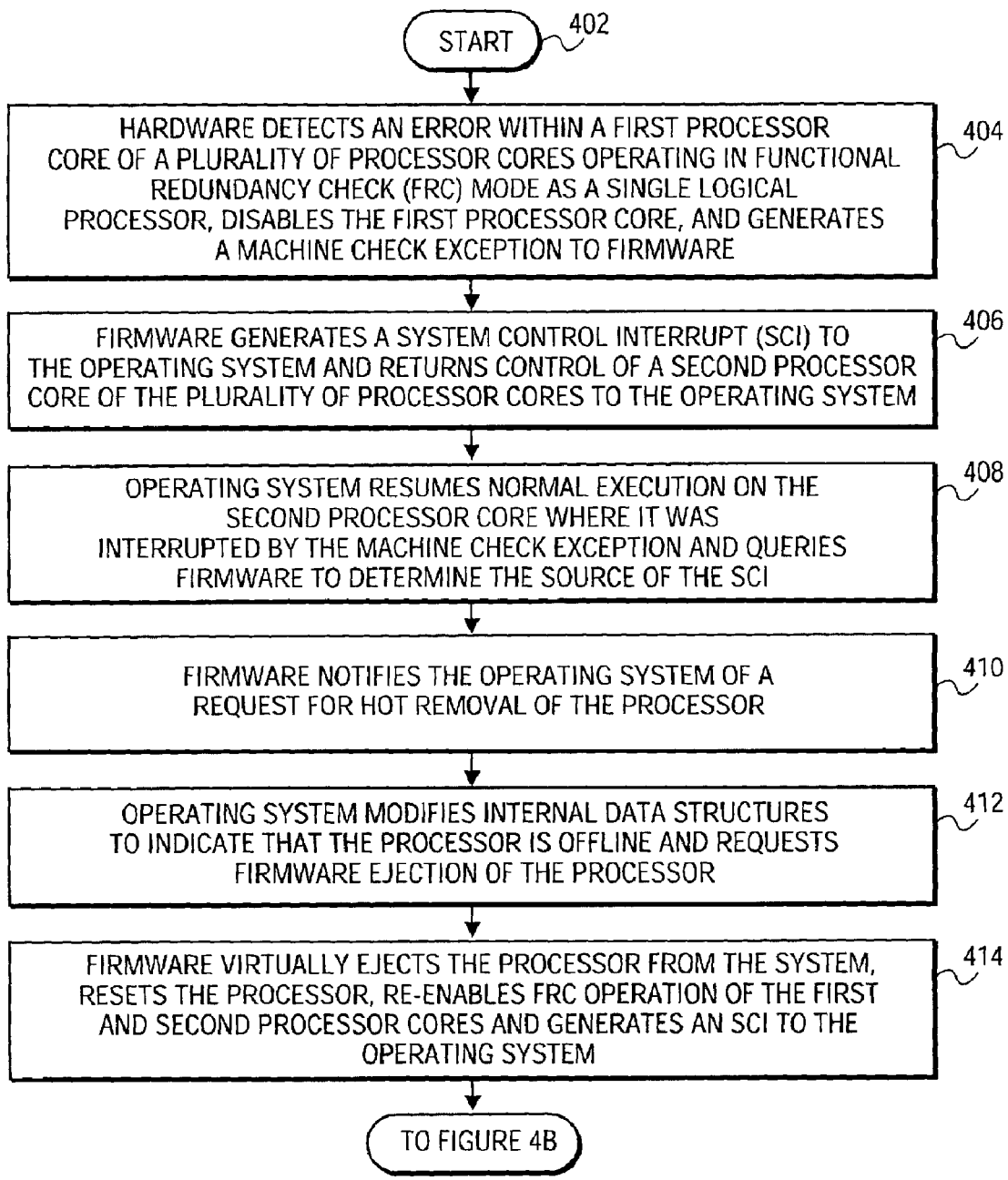
FIG. 4a illustrates a process flow diagram for a first portion of a method according to one embodiment of the present invention.

FIG. 4a illustrates a process flow diagram for a first portion of a method according to one embodiment of the present invention. The illustrated process begins (block 402) and thereafter hardware (e.g FRC logic) detects an error within a first processor core of a plurality of processor cores operating in an FRC mode as a single logical processor, disables the first processor core, and generates a system-transparent machine check exception (block 404) which in turn causes firmware (e.g. SAL program code) to generate a system-visible system control interrupt (SCI) to operating system (OS) software and return control of at least a second, error-free processor core of the plurality of processor cores to the OS (block 406). In alternative embodiments in which the described plurality includes three or more processor cores, additional error-free cores may also be turned over to operating system control.

OS software then resumes execution on the second processor core where it was interrupted by the machine check exception and queries firmware (e.g. ACPI BIOS) to determine the source of the SCI (block 408). In one embodiment, this may be accomplished by the OS executing an _Lxx control method. Firmware responds to the OS query by notifying the operating system of a request for processor hot removal (block 410). This may be accomplished using an ACPI Notify command. The operating system then modifies its internal data structures to indicate that the processor is offline and requests firmware ejection of the processor (block 412). In one embodiment, the operating system requests firmware ejection of the processor by executing an _EJx control method.

Figure 4B:
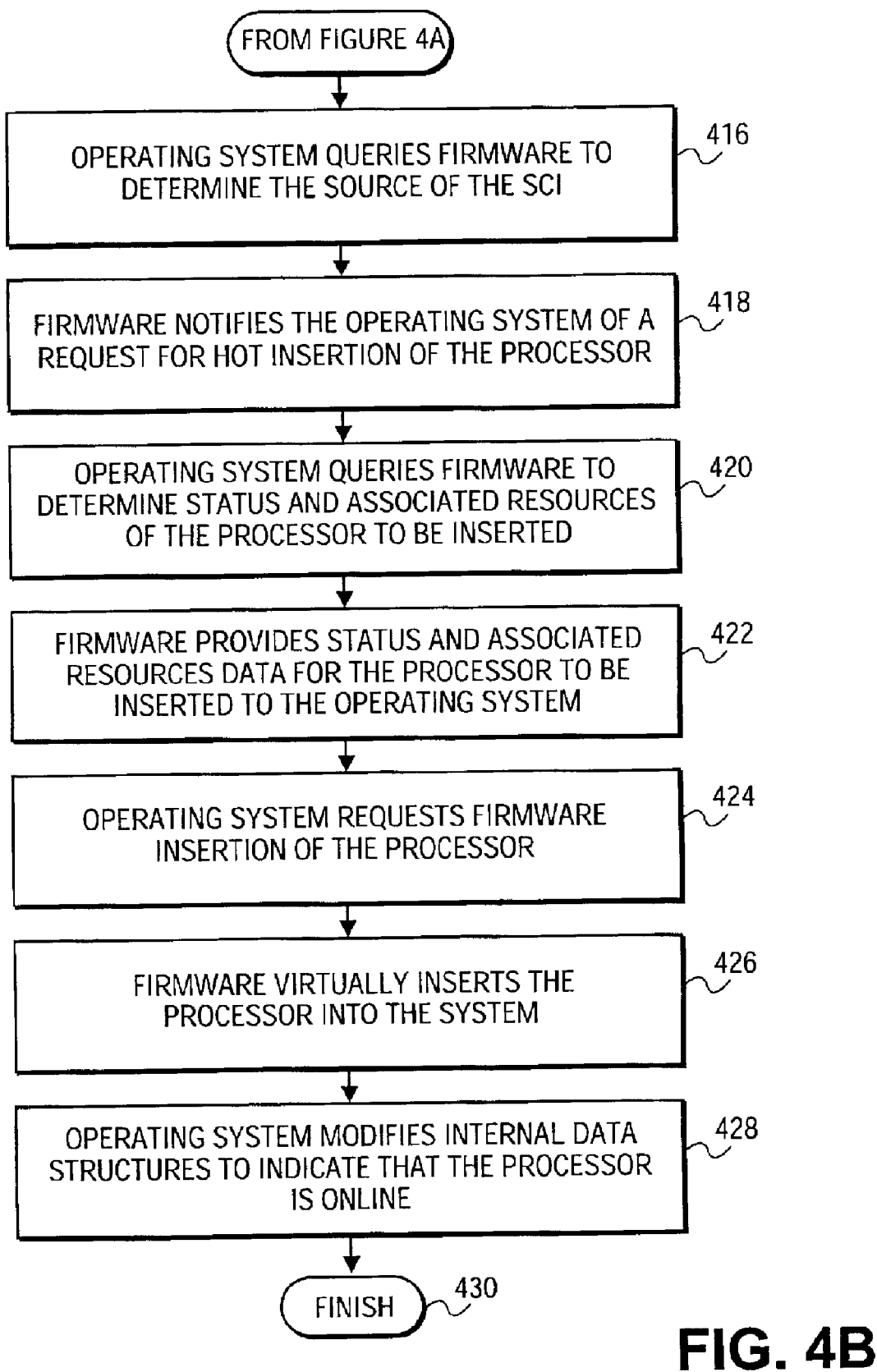
FIG. 4b illustrates a process flow diagram for a second portion of a method according to one embodiment of the present invention.

In response to the operating system ejection request, firmware virtually ejects the processor from the system, resets the processor, re-enables FRC operation of at least the first and second processor cores and generates an SCI to the Operating System (block 414) before beginning a second portion of the illustrated method embodiment depicted in FIG. 4b. Thereafter, in the process illustrated in FIG. 4b, operating system software queries firmware (e.g. ACPI BIOS) to determine the source of the previously-generated SCI (block 416). Firmware responds to the OS query by notifying the operating system of a request for processor hot insertion (block 418). Next, the operating system queries firmware to determine the status and to identify the associated resources of the processor to be inserted (block 420) and firmware provides the operating system with the requested data (block 422). In one embodiment, this may be accomplished by executing one or more control methods (e.g., _STA, _MAT, and _CRS). Once the relevant status and resource data is received, the operating system requests insertion of the processor (block 424) and the firmware virtually inserts the processor into the system (block 426). In one embodiment, the operating system may request insertion of the processor using a _PS0 control method which puts a device into its D0 or "active" state. Once the processor has been inserted and/or activated as described, the OS modifies its internal data structures to indicate that the processor is online and available before the illustrated process terminates (block 430).

In the foregoing description, the present invention has been described with reference to specific exemplary embodiments thereof. It will be apparent however, that variations or modifications of the exemplary embodiments described as well as alternative embodiments of the present invention may be implemented without departing from the broader spirit or scope of the present invention as defined in the appended claims. The specification and drawings are accordingly to be regarded in an illustrative rather than a restrictive sense.

What is claimed is:

1. A method comprising:
   operating a processor including a first processor core and a second processor core in a functional redundancy check mode comprises concurrently executing a thread on said first processor core and said second processor core;
   detecting an event associated with said processor within a data processing system;
   initiating a platform-independent device removal sequence for said processor in response to detecting said event associated with said processor;
   saving a context of said thread in response to initiating said platform-independent device removal sequence;
   virtually ejecting said processor from said data processing system in response to initiating said platform-independent device removal sequence for said device; and servicing said event associated with said processor in response to virtually ejecting said processor from said data processing system.

2. The method of claim 1, wherein initiating a platform-independent device removal sequence for said processor in response to detecting said event associated with said processor comprises generating a system control interrupt.

3. The method of claim 2, wherein generating a system control interrupt comprises generating a system control interrupt utilizing an INT_OUT command.

4. The method of claim 1, wherein detecting an event associated with said processor within a data processing system comprises detecting an error within at least one of said first processor core and said second processor core.

5. The method of claim 1, said method further comprising disabling interrupts to said processor in response to initiating said platform-independent device removal sequence.

6. The method of claim 4, said method further comprising disabling said functional redundancy check mode in response to detecting said error within at least one of said first processor core and said second processor core.

7. The method of claim 6, wherein servicing said event associated with said processor in response to virtually ejecting said processor from said data processing system comprises:
resetting said processor; and
re-enabling said functional redundancy check mode in response to resetting said processor.

8. The method of claim 1, said method further comprising:
initiating a platform-independent device insertion sequence for said processor in response to servicing said event associated with said processor; and
virtually inserting said processor into said data processing system in response to initiating said platform-independent device insertion sequence for said processor.

9. A machine-accessible medium having machine-executable instructions embodied therein which, when executed by a machine, causes said machine to perform a method comprising:
operating a processor including a first processor core and a second processor core in a functional redundancy check mode by concurrently executing a thread on said first processor core and said second processor core;
detecting an event associated with said processor within a data processing system;
initiating a platform-independent device removal sequence for said processor in response to detecting said event associated with said processor;
saving a context of said thread in response to initiating a platform-independent device removal sequence for said processor;
virtually ejecting said processor from said data processing system in response to initiating said platform-independent device removal sequence for said processor; and
servicing said event associated with said processor in response to virtually ejecting said processor from said data processing system.

10. The machine-accessible medium of claim 9, wherein detecting an event associated with said processor within said data processing system comprises detecting an error within at least one of said first processor core and said second processor core.

11. The machine-accessible medium of claim 9, said method further comprising disabling interrupts to said processor in response to initiating said platform-independent device removal sequence.

12. The machine-accessible medium of claim 10, said method further comprising disabling said functional redundancy check mode in response to detecting said error within said at least one of said first processor core and said second processor core.

13. The machine-accessible medium of claim 12, wherein servicing said event associated with said processor in response to virtually ejecting said processor from said data processing system comprises:
resetting said processor; and
re-enabling said functional redundancy check mode in response to resetting said processor.

14. A data processing system comprising:
a processor including a first processor core and a second processor core;
a memory coupled to said processor, said memory including a firmware interface to initiate a platform-independent device removal sequence for said processor in response to a detection of an event associated with said processor, to virtually eject said processor from said data processing system in response to an initiation of said platform-independent device removal sequence, and to service said event associated with said processor in response to a virtual ejection of said processor from said data processing system;
a functional redundancy check logic to operate said first processor core and said second processor core in a functional redundancy check mode comprises functional redundancy check logic to concurrently execute a thread on said first processor core and said second processor core; and
said memory further includes an operating system to save a context of said thread in response to an initiation of a platform-independent device removal sequence for said processor.

15. The data processing system of claim 14, wherein said firmware interface to initiate said platform-independent device removal sequence for said processor in response to a detection of an event associated with said processor comprises a firmware interface to generate a system control interrupt.

16. The data processing system of claim 15, wherein said firmware interface to generate said system control interrupt comprises a firmware interface to generate a system control interrupt utilizing an INT_OUT command.

17. The data processing system of claim 14, wherein said firmware interface to initiate said platform-independent device removal sequence for said processor in response to a detection of said event comprises a firmware interface to initiate a platform-independent device removal sequence for said processor in response to a detection of an error within at least one of said first processor core and said second processor core.

18. The data processing system of claim 14, said memory further including an operating system to disable interrupts to said processor in response to an initiation of a platform-independent device removal sequence for said processor.

19. The data processing system of claim 14, wherein said firmware interface further comprises a firmware interface to disable said functional redundancy check mode in response to said detection of an event associated with said processor.

20. The data processing system of claim 19, wherein said firmware interface to service said event associated with said processor in response to said virtual ejection of said processor from said data processing system comprises a firmware interface to reset said processor and to re-enable said functional redundancy check mode in response to a reset of said processor.

21. The data processing system of claim 14, wherein said firmware interface further comprises a firmware interface to initiate said platform-independent device insertion sequence in response to a servicing of said event associated with said processor and to virtually insert said processor into said data processing system in response to an initiation of said platform-independent device insertion sequence.

22. An apparatus comprising:
   a first firmware interface to detect an event associated with a processor within a data processing system, said processor including a first processor core and a second processor core in a functional redundancy check mode by concurrently executing a thread on said first processor core and said second processor core;
   a second firmware interface to initiate a platform-independent device removal sequence for said processor in response to a detection of said event associated with said processor to save a context of said thread in response to initiation of said platform-independent device removal sequence;
   a third firmware interface to virtually eject said processor from said data processing system in response to an initiation of a platform-independent device removal sequence for said processor; and
   a fourth firmware interface to service said event associated with said processor in response to a virtual ejection of said processor from said data processing system.

23. The apparatus of claim 22, wherein said second firmware interface to initiate said platform-independent device removal sequence comprises a firmware interface to generate a system control interrupt.

24. The apparatus of claim 22, said apparatus further comprising:
   a fifth firmware interface to initiate said platform-independent device insertion sequence in response to servicing of said event associated with said processor; and
   a sixth firmware interface to virtually insert said processor into said data processing system in response to an initiation of said platform-independent device insertion sequence.

* * * * *